(12) United States Patent
Kabeya et al.

(10) Patent No.: US 11,585,440 B2
(45) Date of Patent: Feb. 21, 2023

(54) HOLE PLUG ATTACHMENT STRUCTURE

(71) Applicant: Nifco Inc., Yokosuka (JP)

(72) Inventors: Satoshi Kabeya, Kariya (JP); Takehiro Sato, Yokosuka (JP)

(73) Assignee: Nifco Inc., Yokosuka (JP)

( * ) Notice: Subject to any disclaimer, the term of this patent is extended or adjusted under 35 U.S.C. 154(b) by 274 days.

(21) Appl. No.: 16/957,767

(22) PCT Filed: Oct. 29, 2018

(86) PCT No.: PCT/JP2018/040190
§ 371 (c)(1),
(2) Date: Jun. 25, 2020

(87) PCT Pub. No.: WO2019/130792
PCT Pub. Date: Jul. 4, 2019

(65) Prior Publication Data
US 2021/0364086 A1    Nov. 25, 2021

(30) Foreign Application Priority Data
Dec. 27, 2017  (JP) .............................. JP2017-252222

(51) Int. Cl.
*F16J 13/14*        (2006.01)
(52) U.S. Cl.
CPC ..................................... *F16J 13/14* (2013.01)
(58) Field of Classification Search
CPC ............. F16J 13/14; F16J 13/02; B62D 25/24
See application file for complete search history.

(56) References Cited

U.S. PATENT DOCUMENTS

| 2004/0057812 A1* | 3/2004 | Schaty | F16B 19/008 |
| | | | 411/508 |
| 2014/0125081 A1* | 5/2014 | Pares Isanta | B62D 25/24 |
| | | | 296/1.06 |

(Continued)

FOREIGN PATENT DOCUMENTS

| JP | 2011121575 A | * | 6/2011 | ............. B62D 25/24 |
| JP | 2012241843 A | * | 12/2012 | ............... F16J 13/14 |

(Continued)

OTHER PUBLICATIONS

International Search Report and the Written Opinion dated Nov. 27, 2018 From the International Searching Authority Re. Application No. PCT/JP2018/040190 and Its Translation of Search Report Into English. (8 Pages).

*Primary Examiner* — Eugene G Byrd

(57) ABSTRACT

A hole plug attachment structure includes: a first attachment-target member is formed with a first attachment hole; a second attachment-target member is formed with a second attachment hole; and a hole plug that includes a tube-shaped outer peripheral wall, a blocking portion, a ring shaped flange jutting out toward a radial direction outer side of the outer peripheral wall from an end portion of the outer peripheral wall on an opposite side from an insertion direction so as to cover a location surrounding the second attachment hole, and a hook portion, a location of the flange that abuts an edge of the second attachment hole being thicker than a location of the flange that abuts the edge of the first attachment hole, in a state in which a back face of the flange abuts both the edge of the first attachment hole and the edge of the second attachment hole.

3 Claims, 7 Drawing Sheets

(56) References Cited

U.S. PATENT DOCUMENTS

2014/0311038 A1* 10/2014 Iwahara ................ B62D 25/24
                                                              49/466
2016/0244104 A1*  8/2016 Kuhm ................... B05C 21/005

FOREIGN PATENT DOCUMENTS

| JP | 2013-155805 |   | 8/2013 |   |           |
|----|-------------|---|--------|---|-----------|
| JP | 2014114851 A | * | 6/2014 | ............... | F16J 13/14 |
| JP | 2015081659 A | * | 4/2015 | ............. | B62D 25/24 |
| WO | WO 2019/130792 |  | 7/2019 |   |           |

* cited by examiner

HOLE PLUG ATTACHMENT STRUCTURE

RELATED APPLICATIONS

This application is a National Phase of PCT Patent Application No. PCT/JP2018/040190 having International filing date of Oct. 29, 2018, which claims the benefit of priority of Japanese Patent Application No. 2017-252222 filed on Dec. 27, 2017. The contents of the above applications are all incorporated by reference as if fully set forth herein in their entirety.

FIELD AND BACKGROUND OF THE INVENTION

The present disclosure relates to a hole plug attachment structure.

Japanese Patent Application Laid-Open (JP-A) No. 2013-155805 discloses a hole plug that is attached to an attachment hole (through hole) formed in an attachment-target member (door inner panel). The hole plug includes a tube shaped outer peripheral wall (side peripheral wall) that is inserted into the attachment hole, a blocking portion (bottom portion) that closes off the inside of the outer peripheral wall, and a ring shaped flange (lip) that juts out toward a radial direction outer side from an end portion of the outer peripheral wall on an opposite side from an insertion direction. An outer peripheral portion of the flange is thicker than a base portion of the flange.

SUMMARY OF THE INVENTION

Technical Problem

A hole plug may be inserted into and attached to respective attachment holes formed in plural overlapping panel members. During insertion of the hole plug, if the hole plug is pressed in further in a state in which a back face of the flange has abutted an edge of a large diameter attachment hole, the flange might bend backward. This issue with the flange bending backward also affects the hole plug disclosed in JP-A No. 2013-155805.

In consideration of the above circumstances, an object of the present disclosure is to provide a hole plug attachment structure that suppresses a flange from bending backward when a hole plug is inserted into respective attachment holes formed in plural overlapping attachment-target members.

Solution to Problem

A hole plug attachment structure of a one aspect of the present disclosure includes: a first attachment-target member that is formed with a first attachment hole; a second attachment-target member that is formed with a second attachment hole larger in diameter than the first attachment hole and that overlaps the first attachment-target member, in a state in which the first attachment hole and the second attachment hole are aligned; and a hole plug that includes a tube-shaped outer peripheral wall configured to be inserted into the first attachment hole and the second attachment hole, a blocking portion spanning an inside of the outer peripheral wall so as to close off the inside of the outer peripheral wall, a ring shaped flange jutting out toward a radial direction outer side of the outer peripheral wall from an end portion of the outer peripheral wall on an opposite side from an insertion direction so as to cover a location surrounding the second attachment hole, and a hook portion projecting toward the radial direction outer side from an insertion direction end portion side of the outer peripheral wall so as to engage with an edge of the first attachment hole, a location of the flange that abuts an edge of the second attachment hole being thicker than a location of the flange that abuts the edge of the first attachment hole, in a state in which a back face of the flange abuts both the edge of the first attachment hole and the edge of the second attachment hole.

Advantageous Effects of Invention

The present disclosure enables the provision of a hole plug attachment structure that suppresses the flange from bending backward when the hole plug is inserted into respective attachment holes formed in plural overlapping attachment-target members.

DESCRIPTION OF SPECIFIC EMBODIMENTS OF THE INVENTION

Explanation follows regarding a hole plug attachment structure S according to an exemplary embodiment of the present disclosure, with reference to FIG. 1 to FIG. 7. The hole plug attachment structure S of the present exemplary embodiment includes an attachment-target member 12, an attachment-target member 14, and a hole plug 20.

Figure 1:
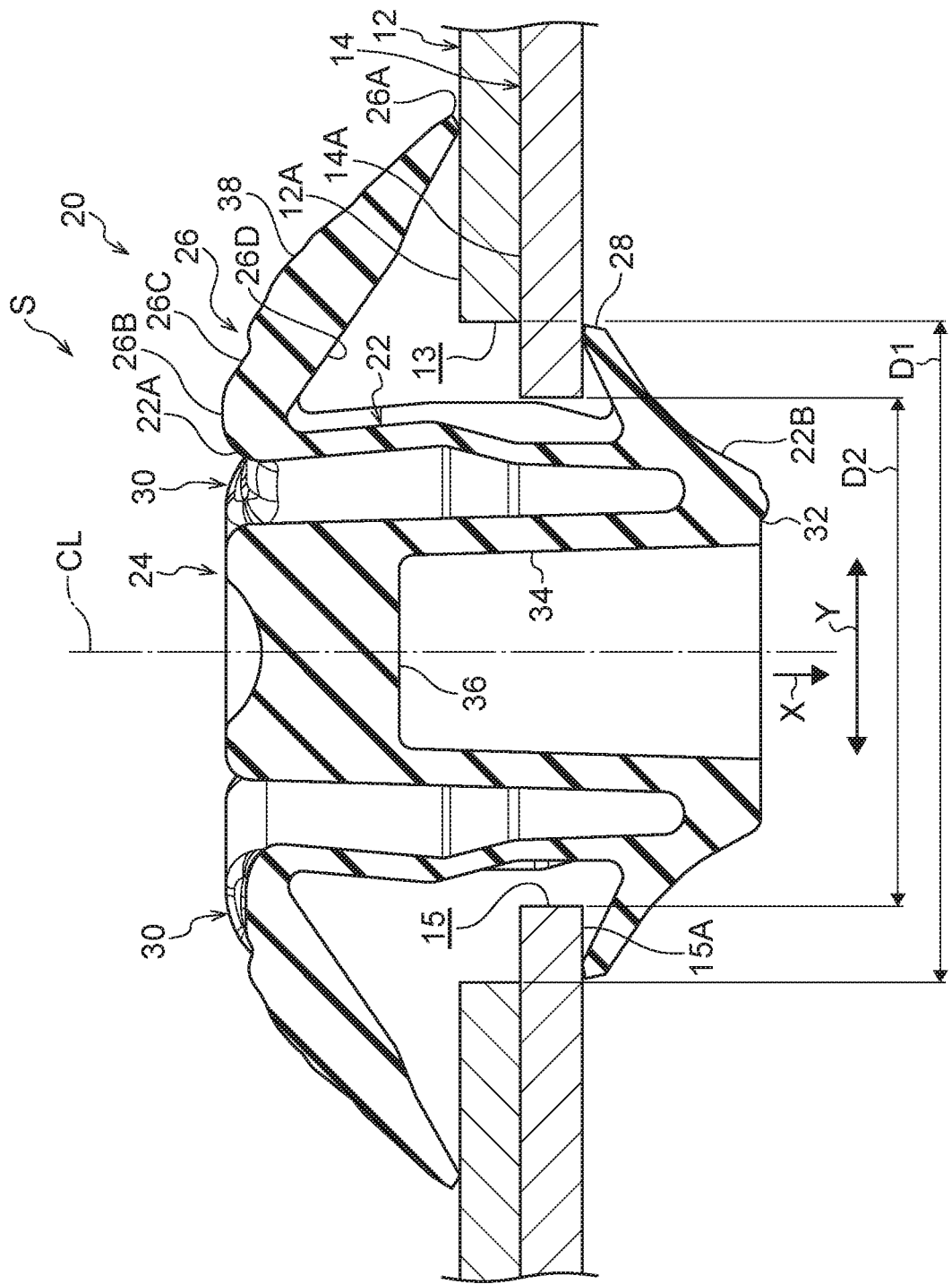
FIG. 1 is a cross-section of a hole plug, illustrating a hole plug attachment structure according to an exemplary embodiment of the present disclosure.

As illustrated in FIG. 1, the attachment-target member 12 includes a plate-shaped section 12A, and a through hole 13 is formed through the plate-shaped section 12A. The through hole 13 is larger in diameter than a through hole 15 formed through the attachment-target member 14, described below. Specifically, a diameter D1 of the through hole 13 is larger than a diameter D2 of the through hole 15. Note that the attachment-target member 12 is for example a panel member of a vehicle (for example a body panel). The attachment-target member 12 of the present exemplary embodiment is an example of a second attachment-target member of the present disclosure, and the through hole 13 is an example of a second attachment hole of the present disclosure.

The attachment-target member 14 includes a plate-shaped section 14A, and the through hole 15 is formed through the plate-shaped section 14A. The attachment-target member 14 is attached to the attachment-target member 12 in a state in which the through hole 15 is aligned with the through hole 13 in the attachment-target member 12. The attachment-target member 14 is for example a bracket attached to the panel member of the vehicle.

The attachment-target member 14 of the present exemplary embodiment is an example of a first attachment-target member of the present disclosure, and the through hole 15 is an example of a first attachment hole of the present disclosure.

As illustrated in FIG. 1, the hole plug 20 is a member that is attached to the attachment-target member 12 and the attachment-target member 14 so as to close off the through hole 13 and the through hole 15. Note that the arrow X illustrated in some of the drawings of FIG. 1 to FIG. 7 represents an insertion direction of the hole plug 20 (hereafter referred to as the "plug insertion direction" as appropriate), the arrow Y represents a radial direction of the hole plug 20 (hereafter referred to as the "plug radial direction" as appropriate), and the arrow Z represents a circumferential direction of the hole plug 20 (hereafter referred to as the "plug circumferential direction" as appropriate). The reference numeral CL represents a center line of the hole plug 20. Note that the plug radial direction inner side refers to the side closer to the center line CL in the plug radial direction, and the plug radial direction outer side refers to the side further from the center line CL in the plug radial direction.

Figure 2:
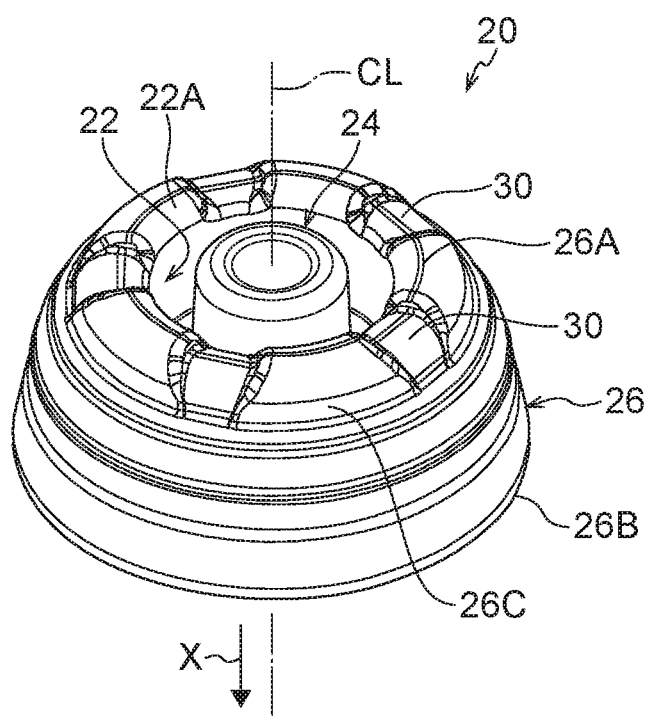
FIG. 2 is a perspective view of the hole plug illustrated in FIG. 1, as viewed obliquely from above.
Figure 3:
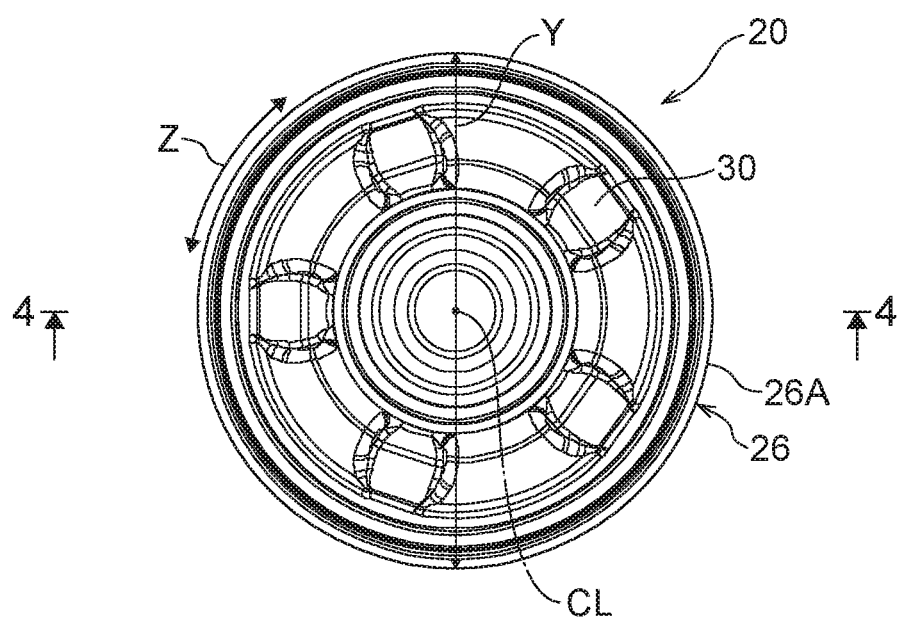
FIG. 3 is a plan view of the hole plug illustrated in FIG. 2.
Figure 4:
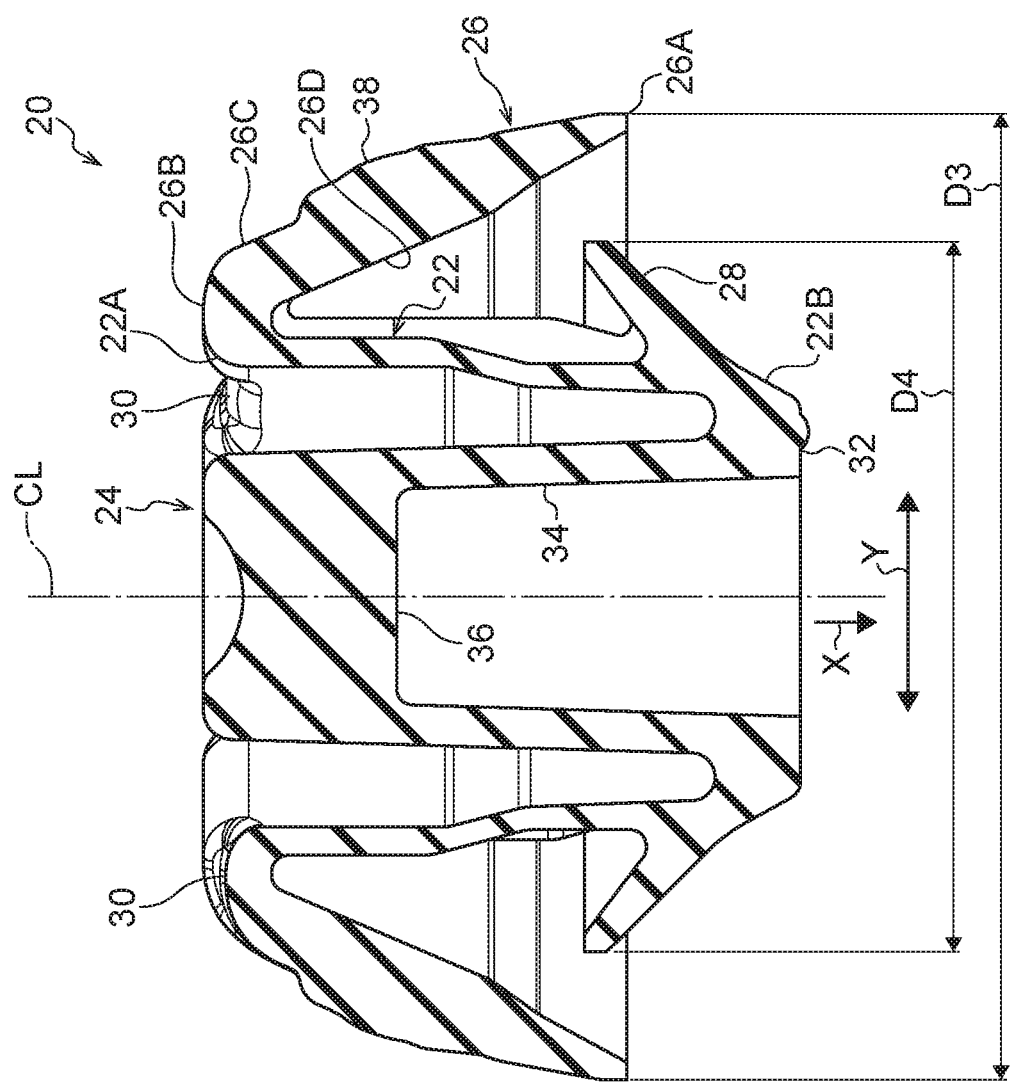
FIG. 4 is a cross-section of the hole plug illustrated in FIG. 3, as sectioned along line 4-4.

As illustrated in FIG. 2 to FIG. 4, the hole plug 20 includes an outer peripheral wall 22, a blocking portion 24, a flange 26, a hook portion 28, and grooves 30. Note that the hole plug 20 of the present exemplary embodiment is an integrally molded component configured from an elastically deformable resin.

As illustrated in FIG. 1 and FIG. 4, the outer peripheral wall 22 has a tube shape (a circular tube shape in the present exemplary embodiment), and is configured to be inserted into the through hole 13 in the attachment-target member 12 and the through hole 15 in the attachment-target member 14. Note that in the present exemplary embodiment, a circular tube shape encompasses shapes with both perfectly circular and elliptical cross-section profiles. Moreover, in the present exemplary embodiment, a circular ring shape encompasses both perfect circles and ellipses.

As illustrated in FIG. 3 and FIG. 4, the blocking portion 24 spans the inside of the outer peripheral wall 22 so as to block off the inside of the outer peripheral wall 22. Thus, in an engaged state in which the hook portion 28 of the hole plug 20 has engaged with an edge 15A of the through hole 15 in the attachment-target member 14 (hereafter referred to as the "hook portion engaged state" as appropriate), the through hole 15 is closed off by the blocking portion 24. The blocking portion 24 includes a circular ring shaped lip 32 that juts out toward the plug radial direction inner side from a plug insertion direction end portion 22B of the outer peripheral wall 22, a circular tube shaped inner peripheral wall 34 that extends in the opposite direction to the plug insertion direction from an inner peripheral end portion of the lip 32, and a face plate 36 that spans across inside an end portion of the inner peripheral wall 34 on an opposite side of the inner peripheral wall 34 to the plug insertion direction.

As illustrated in FIG. 2 and FIG. 4, the flange 26 juts out toward the plug radial direction outer side from an end portion 22A of the outer peripheral wall 22 on an opposite side of the outer peripheral wall 22 to the plug insertion direction. The flange 26 is formed in a ring shape (a circular ring shape in the present exemplary embodiment). In an unladen state, a diameter D3 of a leading end portion 26A of the flange 26 of the present exemplary embodiment is a larger diameter than the diameter D1 of the through hole 13 in the attachment-target member 12. Thus, in the hook portion engaged state in which the hook portion 28 of the hole plug 20 has engaged with the edge 15A of the through hole 15 in the attachment-target member 14, a location surrounding the through hole 15 in the attachment-target member 14 and a location surrounding the through hole 13 in the attachment-target member 12 are covered by the flange 26 (see FIG. 1).

As illustrated in FIG. 1 and FIG. 4, a circular ring shaped ridge portion 38 that extends in the plug circumferential direction is formed at a front face 26C of the flange 26 of the present exemplary embodiment. A region of the flange 26 where the ridge portion 38 is formed (hereafter referred to as the "formation region" as appropriate) is thicker than a region of the flange 26 where the ridge portion 38 is not formed (hereafter referred to as the "non-formation region" as appropriate). The ridge portion 38 is formed between the leading end portion 26A and a base end portion 26B of the flange 26.

Figure 6:
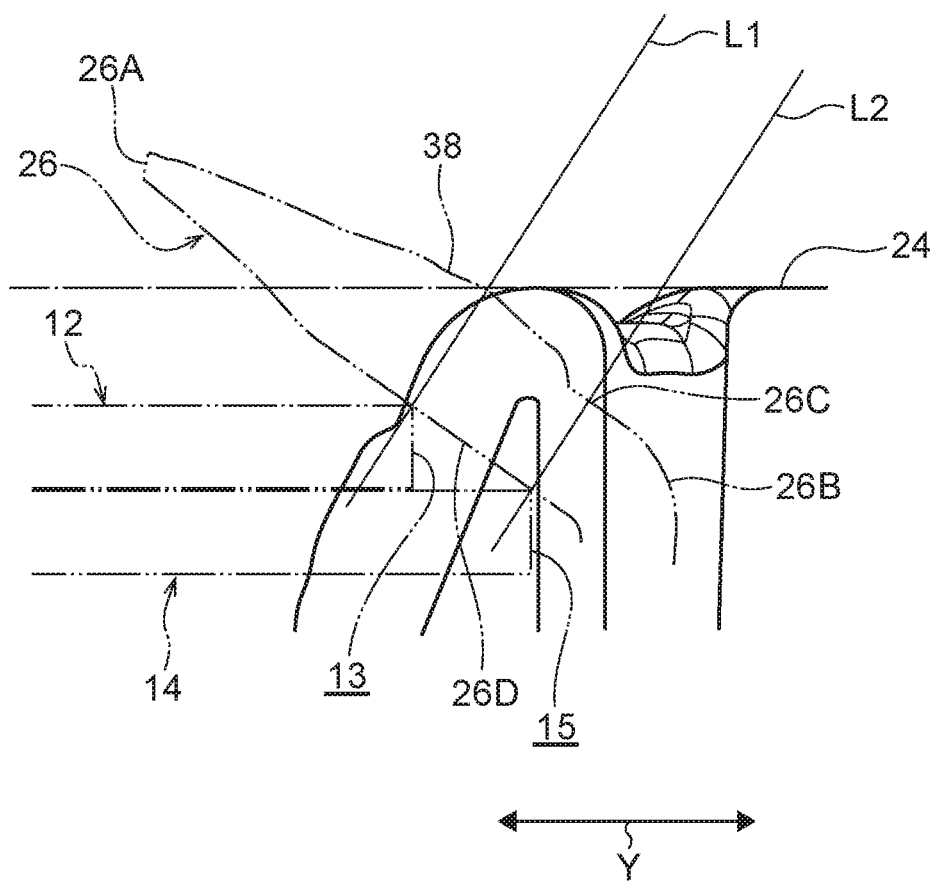
FIG. 6 is an enlarged cross-section of part of the hole plug illustrated in FIG. 1, illustrating a state in which the hole plug has been pressed into attachment holes.

As illustrated in FIG. 6, in a state in which a back face 26D of the flange 26 abuts both an edge of the through hole 13 and an edge of the through hole 15 (hereafter referred to as the "flange abutting state" as appropriate), a location of the flange 26 that abuts the edge of the through hole 13 is thicker than a location of the flange 26 that abuts the edge of the through hole 15. Specifically, in the present exemplary embodiment, in the abutting state of the flange 26, the location of the flange 26 that abuts the edge of the through hole 13 is within the formation region of the ridge portion 38, whereas the location of the flange 26 that abuts the edge of the through hole 15 is outside the formation region of the ridge portion 38 (i.e. is within the non-formation region). Thus, in the abutting state of the flange 26, the location of the flange 26 that abuts the edge of the through hole 13 is thicker than the location of the flange 26 that abuts the edge of the through hole 15. Note that "the location of the flange 26 that abuts the edge of the through hole 13 is within the formation region of the ridge portion 38" refers to the ridge portion 38 being formed at a straight line L1 running perpendicular to the back face 26D of the flange 26 from the location of the back face 26D that abuts the edge of the through hole 13. Moreover "the location of the flange 26 that abuts the edge of the through hole 15 is outside the formation region of the ridge portion 38" refers to the ridge portion 38 not being formed at a straight line L2 running perpendicular to the back face 26D of the flange 26 from the location of the back face 26D that abuts the edge of the through hole 15.

As illustrated in FIG. 4, the hook portion 28 projects from the plug insertion direction end portion 22B side of the outer peripheral wall 22 toward the plug radial direction outer side and in the opposite direction to the plug insertion direction. The hook portion 28 is formed continuously around the outer periphery of the outer peripheral wall 22 so as to have a circular ring shape. In the unladen state, a diameter D4 at a leading end of the hook portion 28 is a larger diameter than the diameter D2 of the through hole 15. Note that during insertion of the hole plug 20 (outer peripheral wall 22) into the through hole 15, an outer peripheral face of the hook portion 28 abuts an inner peripheral face of the through hole 15, such that the hook portion 28 deforms in a diameter-reducing direction. When the hook portion 28 in this reduced diameter state emerges from the through hole 15, the hook portion 28 returns to its original state. Since the diameter D4 at the leading end of the hook portion 28 is larger than the diameter D2 of the through hole 15, if force acts on the hole plug 20 in a direction to remove the hole plug 20 from the through hole 15 (in the opposite direction to the insertion direction), the hook portion 28 engages with (abuts) the edge 15A of the through hole 15, thereby limiting movement of the hole plug 20 in this removal direction (see FIG. 1).

Figure 5:
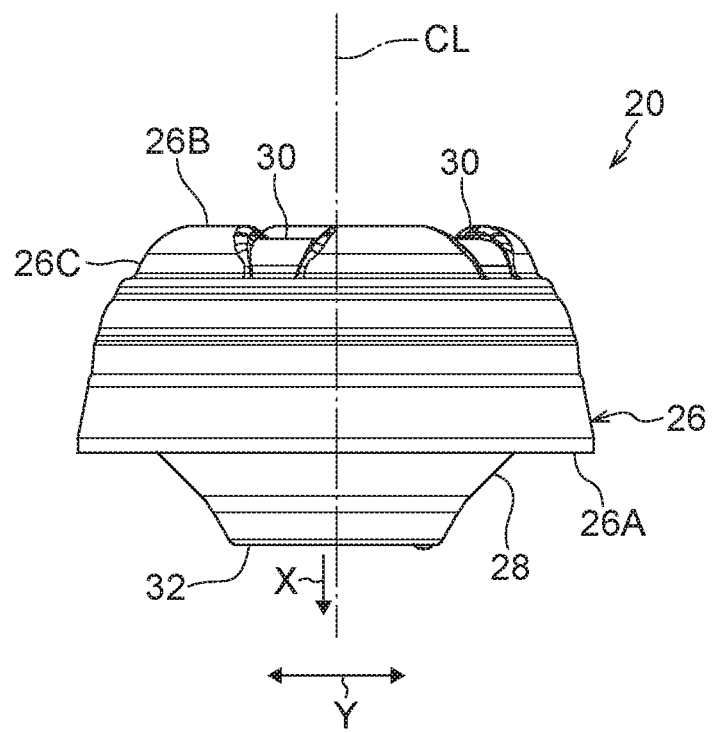
FIG. 5 is a side view of the hole plug illustrated in FIG. 2.

As illustrated in FIG. 2, FIG. 3, and FIG. 5, the front face of the base end portion 26B of the flange 26 is formed with plural of the grooves 30 at intervals in the plug circumferential direction (this being the same direction as the circumferential direction of the flange 26). As illustrated in FIG. 4, the grooves 30 extend from the outer peripheral wall 22 toward the flange 26.

Explanation follows regarding operation and advantageous effects of the hole plug attachment structure S of the present exemplary embodiment.

In the hole plug attachment structure S, during attachment of the hole plug 20 to the through hole 13 and the through hole 15 respectively formed in the mutually overlapping attachment-target member 12 and attachment-target member 14, the outer peripheral wall 22 is inserted into the through hole 13 and the through hole 15 while pressing on the blocking portion 24. Once the outer peripheral wall 22 has been inserted into the through hole 13 and the through hole 15, the hook portion 28 engages with the edge 15A of the through hole 15. The hole plug 20 is thereby prevented from coming out of the through hole 15 and the through hole 13. In the engaged state of the hook portion 28, the outer peripheral wall 22 and the blocking portion 24 close off the through hole 13 and the through hole 15 and the flange 26 covers the location surrounding the through hole 13, such that the hole plug 20 hides the through hole 13 and the through hole 15 and prevents water ingress.

Note that in the abutting state of the flange 26 of the hole plug 20, the location of the flange 26 that abuts the edge of the through hole 13 is thicker than the location of the flange 26 that abuts the edge of the through hole 15. Thus in the hole plug 20, even if the hole plug 20 is pressed further into the through hole 13 and the through hole 15 while in the abutting state of the flange 26, since the location of the flange 26 that abuts the edge of the through hole 13 is thicker, reaction force at this thickened location more strongly suppresses the flange 26 from bending backward than, for example, in configurations in which the location of the flange 26 that abuts the edge of the through hole 13 has the same thickness as or is thinner than the location of the flange 26 that abuts the edge of the through hole 15.

Moreover, in the hole plug attachment structure S, the circular ring shaped ridge portion 38 that extends in the plug circumferential direction is formed at the front face 26C of the flange 26, and the formation region where the ridge portion 38 is formed at the flange 26 is thicker than the non-formation region where the ridge portion 38 is not formed at the flange 26. Thus, in the hole plug attachment structure S, reaction force at this thickened location suppresses the flange 26 from bending backward when the hole plug 20 is pressed into the through hole 13 and the through hole 15. Moreover, in the hole plug attachment structure S, the hole plug 20 is easier to mold than for example in a configuration in which the ridge portion 38 is formed at the back face 26D of the flange 26.

Furthermore, in the hole plug attachment structure S, the ridge portion 38 is formed between the leading end portion 26A and the base end portion 26B of the flange 26. Thus, in the hole plug attachment structure S, the flange 26 more readily undergoes deformation in an expansion direction than for example in configurations in which the ridge portion 38 is formed at the base end portion 26B of the flange 26. This enables the flange 26 to be suppressed from bending backward, while reducing the force required to insert the hole plug 20 into the through hole 13 and the through hole 15.

Figure 7:
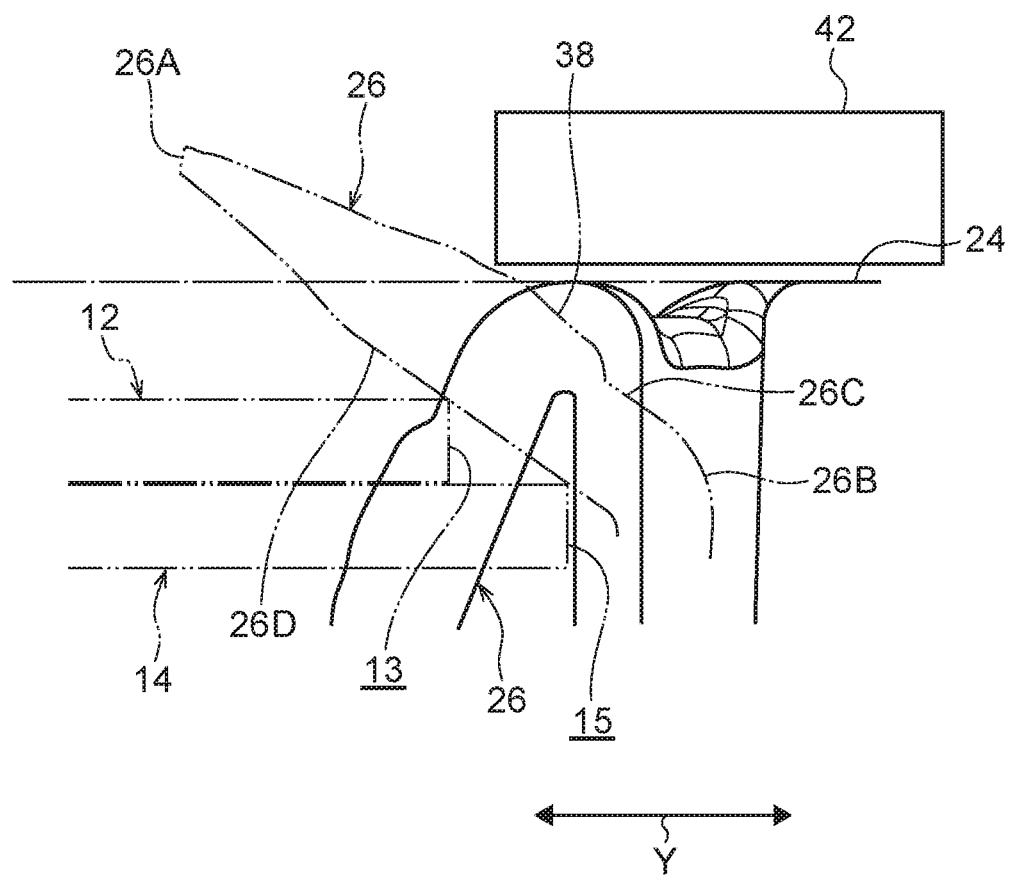
FIG. 7 is an enlarged cross-section of part of the hole plug illustrated in FIG. 1, illustrating a state in which the hole plug has been pressed into attachment holes using a pressing tool.

Moreover, as illustrated in FIG. 7, the blocking portion 24 may be pressed in using a pressing tool 42 when inserting the outer peripheral wall 22 of the hole plug 20 into the through hole 13 and the through hole 15. Note that by setting the height of the ridge portion 38 (the height from the front face 26C) such that the ridge portion 38 abuts the pressing tool 42 in the abutting state of the flange 26, the ridge portion 38 contacts the pressing tool 42 and pushes back against the flange 26, thereby enabling the flange 26 to be effectively suppressed from bending backward. Note that in cases in which the blocking portion 24 is pressed in by a worker, the fingers of the worker contact the ridge portion 38 so as to push back against the flange 26.

In the exemplary embodiment described above, the hook portion 28 projects from the end portion 22B side of the outer peripheral wall 22 (i.e. further toward the end portion 22B side than a plug insertion direction center of the outer peripheral wall 22). However, the present disclosure is not limited to this configuration. For example, the hook portion 28 may project from the end portion 22B of the outer peripheral wall 22.

Moreover, although the hook portion 28 is formed in a circular ring shape in the exemplary embodiment described above, the present disclosure is not limited to this configuration. A configuration may be applied in which plural of the hook portions 28 are formed at the outer peripheral face of the outer peripheral wall 22 at intervals in the plug circumferential direction.

Although the through hole 13 in the attachment-target member 12 and the through hole 15 in the attachment-target member 14 are closed off by the hole plug 20 in the exemplary embodiment described above, the present disclosure is not limited to this configuration. For example, a configuration may be applied in which respective through holes in three or more attachment-target members are closed off by the hole plug 20.

Although an exemplary embodiment of the present disclosure has been described above, the present disclosure is not limited to the above description, and obviously various other modifications may be implemented within a range not departing from the spirit of the present disclosure.

The following supplementary explanation is also disclosed in relation to the above exemplary embodiment.

Supplement 1

A hole plug attachment structure including:

a first attachment-target member that is formed with a first attachment hole;

a second attachment-target member that is formed with a second attachment hole larger in diameter than the first attachment hole and that overlaps the first attachment-target member, in a state in which the first attachment hole and the second attachment hole are aligned; and a hole plug that includes a tube-shaped outer peripheral wall configured to be inserted into the first attachment hole and the second attachment hole, a blocking portion spanning an inside of the outer peripheral wall so as to close off the inside of the outer peripheral wall, a ring shaped flange jutting out toward a radial direction outer side of the outer peripheral wall from an end portion of the outer peripheral wall on an opposite side from an insertion direction so as to cover a location surrounding the second attachment hole, and a hook portion projecting toward the radial direction outer side from an insertion direction end portion side of the outer peripheral wall so as to engage with an edge of the first attachment hole, a location of the flange that abuts an edge of the second attachment hole being thicker than a location of the flange that abuts the edge of the first attachment hole, in a state in which a back face of the flange abuts both the edge of the first attachment hole and the edge of the second attachment hole.

In the hole plug attachment structure of Supplement 1, during attachment of the hole plug to the first attachment hole and the second attachment hole respectively formed in the mutually overlapping first attachment-target member and second attachment-target member, the outer peripheral wall is inserted into the first attachment hole and the second attachment hole while pressing on the blocking portion. Once the outer peripheral wall has been inserted into the first attachment hole and the second attachment hole, the hook portion engages with the edge of the first attachment hole. The hole plug is thereby prevented from coming out of the first attachment hole and the second attachment hole. In this engaged state of the hook portion, the outer peripheral wall and the blocking portion close off the first attachment hole and the second attachment hole and the flange covers the location surrounding the second attachment hole, such that the hole plug hides the first attachment hole and the second attachment hole and prevents water ingress.

Note that in the abutting state of the hole plug in which the back face of the flange abuts both the edge of the first attachment hole and the edge of the second attachment hole (hereafter referred to as the "flange abutting state" as appropriate), the location of the flange that abuts the edge of the second attachment hole is thicker than the location of the flange that abuts the edge of the first attachment hole. Thus, in the hole plug, even if the hole plug is pressed further into the first attachment hole and the second attachment hole while in the flange abutting state, since the location of the flange that abuts the edge of the second attachment hole is thicker, reaction force at this thickened location more strongly suppresses the flange from bending backward than, for example, in configurations in which the location of the flange that abuts the edge of the second attachment hole has the same thickness as or is thinner than the location of the flange that abuts the edge of the first attachment hole.

Supplement 2

The hole plug attachment structure of Supplement 1, wherein:

a ring-shaped ridge portion extending in a circumferential direction of the flange is formed at a front face of the flange; and a region of the flange where the ridge portion is formed is thicker than a region of the flange where the ridge portion is not formed.

In the hole plug attachment structure of Supplement 2, the ring shaped ridge portion that extends in the circumferential direction of the flange is formed at the front face of the flange, and the region of the flange where the ridge portion is formed is thicker than the region of the flange where the ridge portion is not formed. Thus, reaction force at this thickened location suppresses the flange from bending backward when the hole plug is pressed into the first attachment hole and the second attachment hole. Moreover, in this hole plug attachment structure, the hole plug is easier to mold than for example in a configuration in which the ridge portion is formed at the back face of the flange.

Supplement 3

The hole plug attachment structure of Supplement 2, wherein the ridge portion is formed between a leading end portion of the flange and a base end portion of the flange.

In the hole plug attachment structure of Supplement 3, the ridge portion is formed between the leading end portion and the base end portion of the flange. This enables the flange to be suppressed from bending backward, while reducing the force required to insert the hole plug into the first attachment hole and the second attachment hole compared for example to configurations in which a ridge portion is formed at the base end portion of the flange.

The entire content of the disclosure of Japanese Patent Application No. 2017-25222 filed on Dec. 27, 2017 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

What is claimed is:

1. A hole plug attachment structure, comprising: a first attachment-target member that is formed with a first attachment hole; a second attachment-target member that is formed with a second attachment hole larger in diameter than the first attachment hole and that overlaps the first attachment-target member, in a state in which the first attachment hole and the second attachment hole are aligned; and a hole plug that includes a tube-shaped outer peripheral wall configured to be inserted into the first attachment hole and the second attachment hole, a blocking portion spanning an inside of the outer peripheral wall so as to close off the inside of the outer peripheral wall, a ring shaped flange jutting out toward a radial direction outer side of the outer peripheral wall from an end portion of the outer peripheral wall on an opposite side from an insertion direction so as to cover a location surrounding the second attachment hole, and a hook portion projecting toward the radial direction outer side from an insertion direction end portion side of the outer peripheral wall so as to engage with an edge of the first attachment hole, a location of the flange that abuts an edge of the second attachment hole being thicker than a location of the flange that abuts the edge of the first attachment hole, in a state in which a back face of the flange abuts both the edge of the first attachment hole and the edge of the second attachment hole, wherein: a ring-shaped ridge portion that extends in a circumferential direction of the flange and that rises from a front face is formed at the front face of the flange, the location of the flange that abuts the edge of the second attachment hole and that is thicker than the location of the flange that abuts the edge of the first attachment hole is a region of the flange at which the ridge portion is formed; and the region of the flange at which the ridge portion is formed is thicker than a region of the flange at which the ridge portion is not formed.

2. The hole plug attachment structure of claim 1, wherein the ridge portion is formed between a leading end portion of the flange and a base end portion of the flange.

3. The hole plug attachment structure of claim 1, wherein:

a plurality of grooves extending from the outer peripheral wall toward the flange are formed at the front face of the flange; and the ridge portion is formed between a leading end portion of the flange and the grooves.

* * * * *